US011545876B2

(12) United States Patent
Sato

(10) Patent No.: US 11,545,876 B2
(45) Date of Patent: Jan. 3, 2023

(54) MOTOR DEVICE

(71) Applicant: JTEKT CORPORATION, Osaka (JP)

(72) Inventor: Yuto Sato, Nagoya (JP)

(73) Assignee: JTEKT CORPORATION, Osaka (JP)

(\*) Notice: Subject to any disclaimer, the term of this patent is extended or adjusted under 35 U.S.C. 154(b) by 225 days.

(21) Appl. No.: 17/038,752

(22) Filed: Sep. 30, 2020

(65) Prior Publication Data

US 2021/0111609 A1 Apr. 15, 2021

(30) Foreign Application Priority Data

Oct. 11, 2019 (JP) .............................. JP2019-187920

(51) Int. Cl.
*H02K 9/22* (2006.01)
*H02K 11/33* (2016.01)

(52) U.S. Cl.
CPC .............. *H02K 9/22* (2013.01); *H02K 11/33* (2016.01)

(58) Field of Classification Search
CPC ........................................................ H02K 9/22
See application file for complete search history.

(56) References Cited

U.S. PATENT DOCUMENTS

| 10,698,614 B2* | 6/2020 | Lee ....................... G06F 3/0659 |
| 2017/0291635 A1* | 10/2017 | Yamasaki ................. H02P 6/16 |
| 2017/0294860 A1 | 10/2017 | Yamasaki |
| 2020/0251966 A1* | 8/2020 | Endo ....................... H02K 9/227 |
| 2021/0111608 A1* | 4/2021 | Hayashi ................. H02K 11/33 |
| 2021/0111609 A1* | 4/2021 | Sato ....................... H02K 11/33 |
| 2022/0006244 A1* | 1/2022 | Oda ........................ H02K 5/225 |

FOREIGN PATENT DOCUMENTS

| DE | 102017218696 A1 * | 4/2018 | .......... B62D 5/0406 |
| JP | 2017-189034 A | 10/2017 | |
| WO | 2017/158966 A1 | 9/2017 | |
| WO | 2019/070067 A1 | 4/2019 | |

OTHER PUBLICATIONS

Mar. 5, 2021 Search Report issued in European Patent Application No. 20200537.7.

\* cited by examiner

*Primary Examiner* — Robert W Horn
(74) *Attorney, Agent, or Firm* — Oliff PLC

(57) ABSTRACT

A motor device includes a motor, a first substrate, a second substrate, a first heat sink, and a second heat sink. The second substrate is placed to face the first substrate in the plate-thickness direction of the second substrate. A second element group provided on the second substrate has a heat generation amount larger than that of a first element group provided on the first substrate. The first heat sink is placed between the first substrate and the second substrate so as to promote heat dissipation from the first element group and the second element group. The second heat sink is placed on the opposite side of the second substrate from the first heat sink and is configured to promote heat dissipation from the second element group.

6 Claims, 3 Drawing Sheets

MOTOR DEVICE

CROSS-REFERENCE TO RELATED APPLICATION

This application claims priority to Japanese Patent Application No. 2019-187920 filed on Oct. 11, 2019, incorporated herein by reference in its entirety.

BACKGROUND

1. Technical Field

The present disclosure relates to a motor device.

2. Description of Related Art

Japanese Unexamined Patent Application Publication No. 2017-189034 (JP 2017-189034 A) describes a motor device configured such that a motor is integrated with a control device for controlling driving of the motor. The control device includes first and second substrates on each of which an element group for controlling driving of the motor is provided. The first substrate and the second substrate face each other in their plate-thickness direction. A heat sink configured to promote heat dissipation from the first substrate and the second substrate is placed between the first substrate and the second substrate.

SUMMARY

Depending on how the element groups are provided on the first substrate and the second substrate, respective heat generation amounts of the first substrate and the second substrate may have different magnitudes. In this case, it is necessary to more actively promote heat dissipation from a substrate with a relatively large heat generation amount than a substrate with a relatively small heat generation amount. The present disclosure provides a motor device with higher heat dissipation performance by efficiently promoting heat dissipation from substrates having different magnitudes in heat generation amount.

An aspect of the present disclosure relates to a motor device including a motor, a first substrate, a second substrate, a first heat sink, and a second heat sink. A first element group is provided on the first substrate. A second element group is provided on the second substrate, the second element group having a heat generation amount larger than a heat generation amount of the first element group. The second substrate is placed to face the first substrate in the plate-thickness direction of the second substrate. The first heat sink is placed between the first substrate and the second substrate. The first heat sink is configured to promote heat dissipation from the first element group and the second element group. The second heat sink is placed on the opposite side of the second substrate from the first heat sink. The second heat sink is configured to promote heat dissipation from the second element group.

In the above configuration, a first surface of the first substrate in its plate-thickness direction faces the first heat sink. Heat from the first element group is promoted to be dissipated to the first heat sink from the first surface of the first substrate in the plate-thickness direction. Further, a first surface of the second substrate in its plate-thickness direction faces the first heat sink, and a second surface of the second substrate in the plate-thickness direction faces the second heat sink. The second element group and having a heat generation amount larger than that of the first element group is promoted to dissipate heat from the first surface of the second substrate in the plate-thickness direction to the first heat sink and is also promoted to dissipate heat from the second surface of the second substrate in the plate-thickness direction to the second heat sink. Hereby, heat can be dissipated from the opposite sides of the second substrate in the plate-thickness direction, thereby making it possible to more actively promote heat dissipation from the second substrate than heat dissipation from the first substrate. Accordingly, it is possible to increase heat dissipation performance of the motor device.

In the motor device, the first substrate and the first heat sink may be configured to make thermal contact with each other via a heat dissipation material. The first heat sink and the second substrate may be configured to make thermal contact with each other via a heat dissipation material. The second substrate and the second heat sink may be configured to make thermal contact with each other via a heat dissipation material.

In the above configuration, respective heat dissipation paths for the heat sinks facing the substrates can be secured appropriately. This makes it possible to effectively promote heat dissipation from the substrates. In the motor device, the second element group may be a power element group including a switching element having a function to supply a current to the motor. The first element group may be a control element group including a microcomputer configured to control an operation of the switching element.

When the heat generation amount of the switching element is compared with the heat generation amount of the microcomputer, it is generally known that the heat generation amount of the switching element is larger than the heat generation amount of the microcomputer. That is, the heat generation amount from the power element group is larger than the heat generation amount from the control element group. In this case, it is preferable that the motor device employ the above configurations.

The motor device may further include a bottomed tubular motor housing in which the motor is accommodated. The second heat sink may close an opening of the motor housing and may be fixed to an inner wall surface of the motor housing. The second heat sink may be configured to make thermal contact with the motor housing via a fixed part of the second heat sink to the motor housing.

Heat transmitted from the second element group to the second heat sink is transmitted to the motor housing making thermal contact with the second heat sink. Hereby, heat that reaches the motor housing can be dissipated to outside the motor device.

The motor device may include a motor housing in which the motor is accommodated. The first heat sink may be fixed to the motor housing. The first heat sink may be configured to make thermal contact with the motor housing via a fixed part of the first heat sink to the motor housing.

Heat transmitted to the first heat sink from the first element group and the second element group is transmitted to the motor housing making thermal contact with the first heat sink. Hereby, the heat that reaches the motor housing can be dissipated to outside the motor device.

In the motor device, the first heat sink may include a body portion facing the first substrate and the second substrate, and a housing portion connected to the body portion, the housing portion being configured to surround a periphery of the body portion and exposed to outside the motor device.

Hereby, heat that reaches the housing portion of the first heat sink can be dissipated to outside the motor device.

With the motor device according to the present disclosure, it is possible to increase heat dissipation performance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
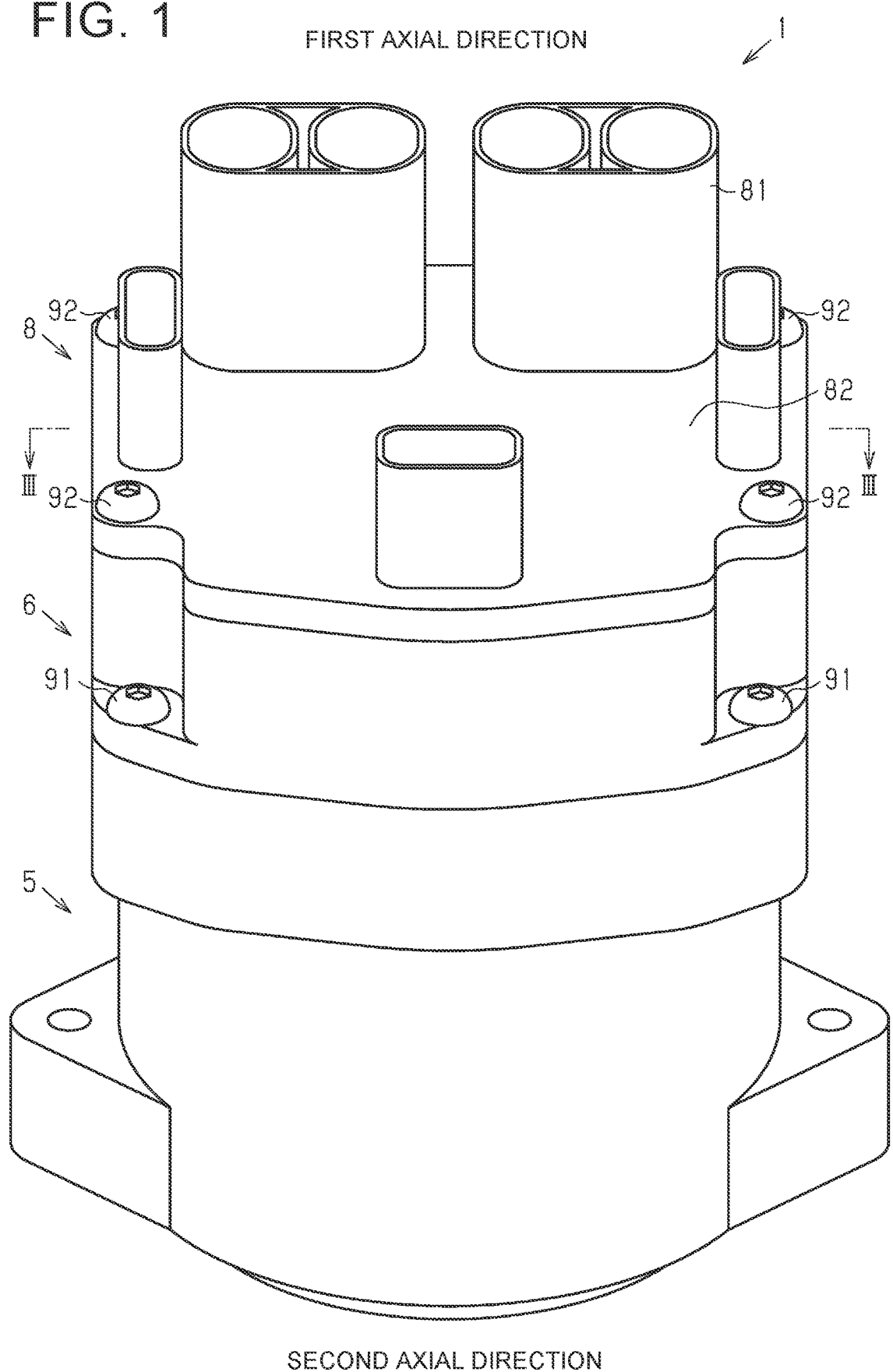
FIG. 1 is a perspective view of a motor device.
Figure 2:
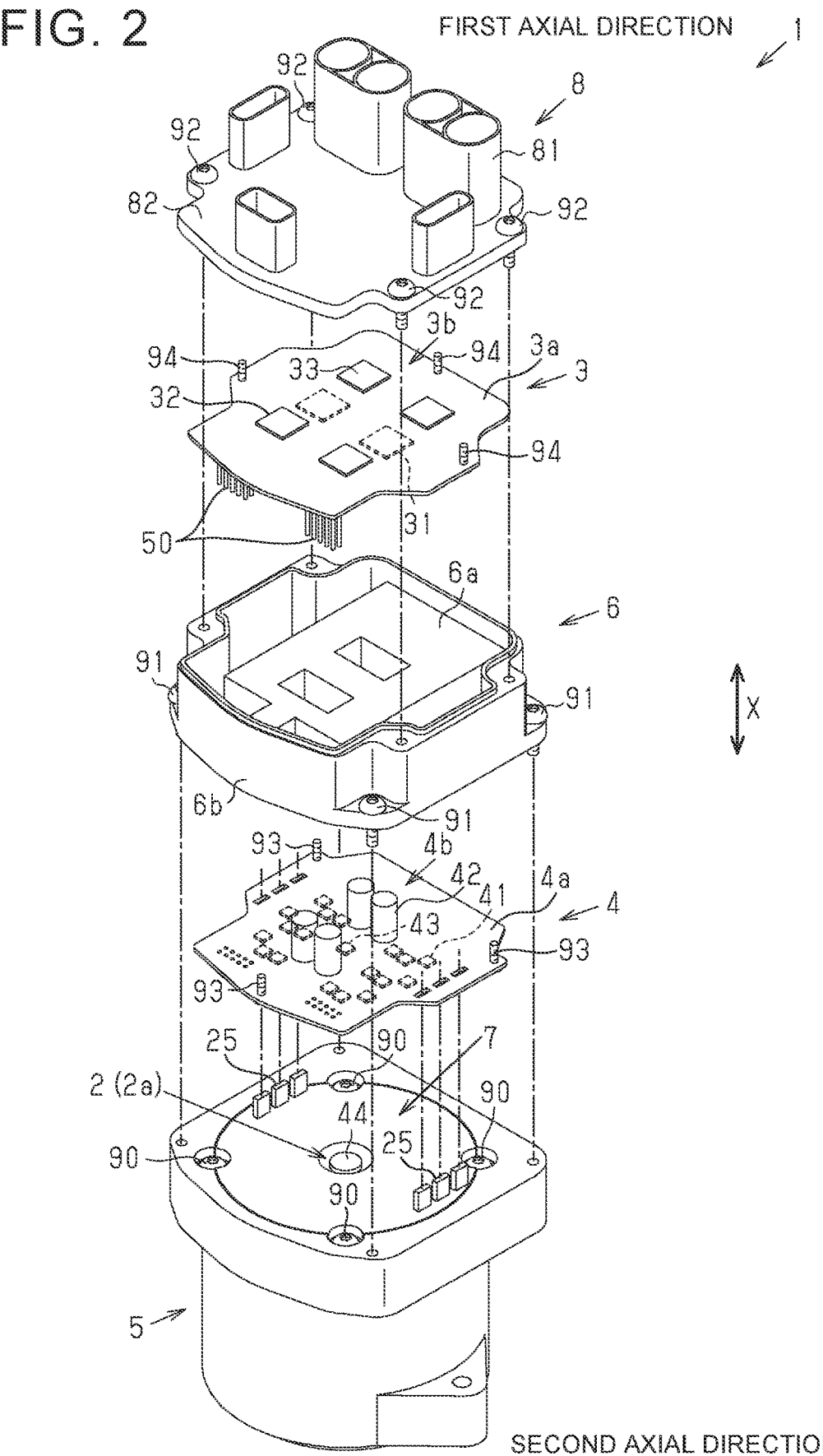
FIG. 2 is an exploded perspective view of the motor device.

One embodiment of a motor device will be described with reference to the drawings. As illustrated in FIGS. 1, 2, a motor device 1 includes a motor 2, a control substrate 3 as a first substrate, a power substrate 4 as a second substrate, a motor housing 5, a first heat sink 6, a second heat sink 7, and an information transfer portion 8. The motor device 1 is provided in an electric power steering system of a vehicle, for example. The power substrate 4 is provided with a power element group 4b as a second element group. The power element group 4b is configured to control a current to be supplied to the motor 2. The control substrate 3 is provided with a control element group 3b as a first element group. The control element group 3b is configured to control driving of the motor 2. The power substrate 4 is placed to face the control substrate 3 in the plate-thickness direction of the power substrate 4 and is placed on a side closer to the motor 2 than the control substrate 3. The motor 2 is accommodated in the motor housing 5. The first heat sink 6 is placed between the control substrate 3 and the power substrate 4. The second heat sink 7 is placed between the power substrate 4 and the motor 2. The second heat sink 7 is fixed to the motor housing 5. The first heat sink 6 is fixed to the motor housing 5. The information transfer portion 8 is provided so as to transfer information to and from an external device. Hereinafter, for purpose of this description, the information transfer portion 8 side is referred to as a first axial direction, and the motor 2 side is referred to as a second axial direction based on an axial direction X of a rotating shaft 2a of the motor 2. The axial direction X is a direction where the rotating shaft 2a of the motor 2 extends.

Figure 3:
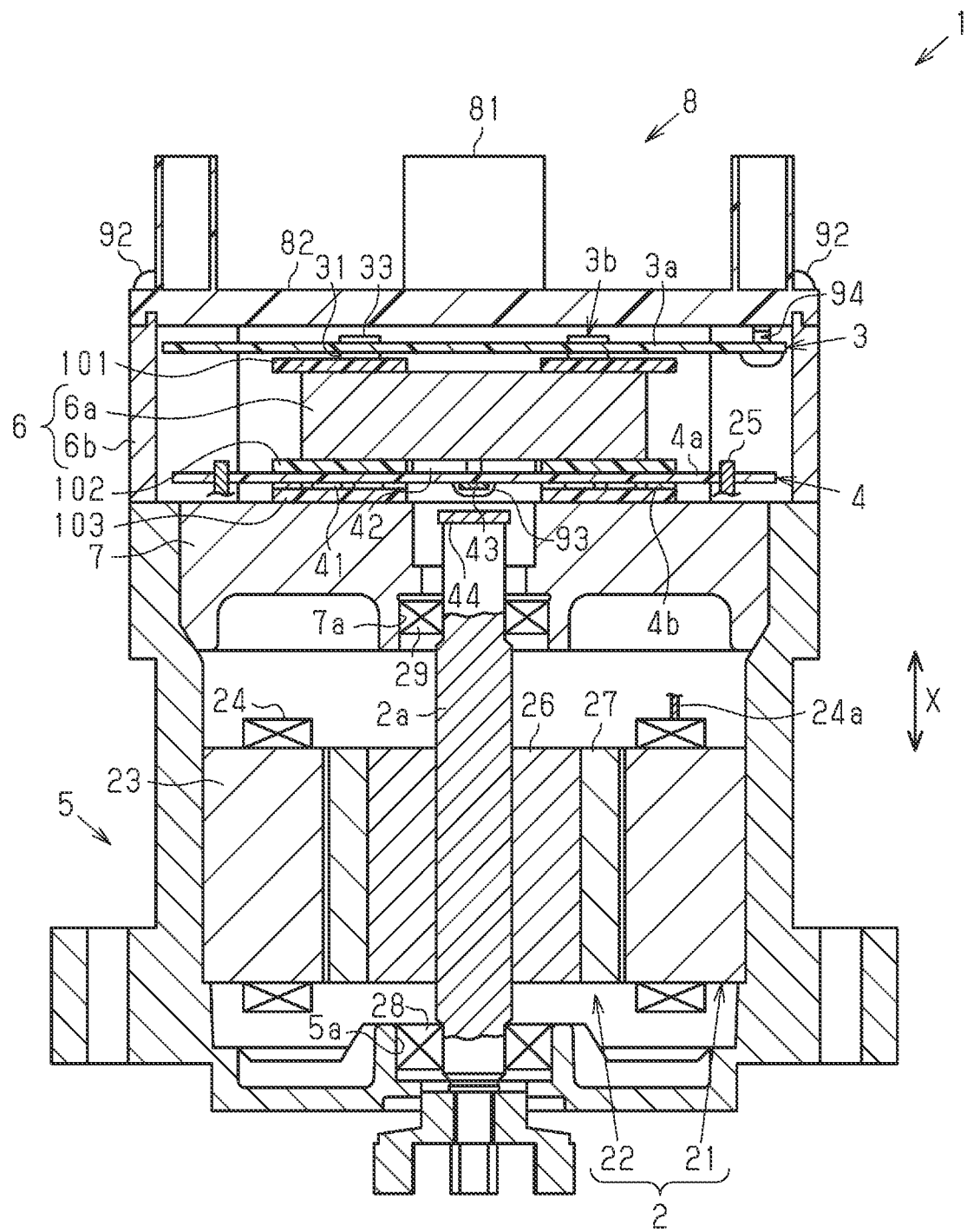
FIG. 3 is a sectional view of the motor device taken along a line III-III in FIG. 1.

As illustrated in FIGS. 2 and 3, the motor housing 5 is a bottomed tubular body. The motor housing 5 is opened on the first axial direction side. The second heat sink 7 closes the opening of the motor housing 5. The motor housing 5, the first heat sink 6, the second heat sink 7, and the information transfer portion 8 constitute a housing in which the motor 2, the control substrate 3, and the power substrate 4 are accommodated. The motor housing 5, the first heat sink 6, and the second heat sink 7 are made of metal having a high heat conductivity, e.g., aluminum or the like.

The following describes the configuration of the motor 2. As illustrated in FIG. 3, the motor 2 includes a stator 21 fixed inside the motor housing 5, and a rotor 22 rotatably placed on the inner periphery of the stator 21.

The stator 21 includes a cylindrical stator core 23 fixed to an inner wall surface of a tubular portion of the motor housing 5, and a motor coil 24 wound around the stator core 23. A connection terminal 24a of the motor coil 24 is connected to the power substrate 4 via a bus bar 25.

The rotor 22 includes a cylindrical rotor core 26 fixed in an integrally rotatable manner together with the rotating shaft 2a, and a plurality of permanent magnets 27 fixed to the outer periphery of the rotor core 26. Magnetic poles of the permanent magnets 27 are placed such that N-poles and S-poles are arranged alternately in the circumferential direction of the rotor core 26.

A first recessed portion 5a is formed in the center of a bottom part of the motor housing 5 such that the first recessed portion 5a penetrates the center of the bottom part of the motor housing 5 in the axial direction X. The first recessed portion 5a is formed in a round shape when the first recessed portion 5a is viewed from the axial direction X. A first bearing 28 is provided in the first recessed portion 5a formed in the motor housing 5. The first bearing 28 is provided between an inner peripheral surface of the first recessed portion 5a and an outer peripheral surface of the rotating shaft 2a. The first bearing 28 supports an end portion, on the second axial direction side, of the rotating shaft 2a such that the end portion of the rotating shaft 2a on the second axial direction side is rotatable relative to the first recessed portion 5a of the motor housing 5. An open end portion of the motor housing 5 has a generally square shape on its outer wall surface and has a generally round shape on its inner wall surface.

The second heat sink 7 closes the opening of the motor housing 5. The outer wall shape of the second heat sink 7 is a generally round shape that is the same shape as the inner wall surface of the opening end portion of the motor housing 5. The second heat sink 7 is provided so as to promote heat dissipation from the motor 2 and the power element group 4b provided on the power substrate 4. A second recessed portion 7a is formed in the center of the second heat sink 7. The second recessed portion 7a is formed in a round shape when the second recessed portion 7a is viewed from the axial direction X. The center of the second recessed portion 7a is provided in a penetrating manner in the axial direction X. A second bearing 29 is provided in the second recessed portion 7a formed in the second heat sink 7. The second bearing 29 supports an end portion, on the first axial direction side, of the rotating shaft 2a such that the end portion of the rotating shaft 2a on the first axial direction side is rotatable relative to the second recessed portion 7a of the second heat sink 7. Hereby, the rotating shaft 2a is supported rotatably relative to the inner wall surfaces of the motor housing 5 and the second heat sink 7 via the first bearing 28 and the second bearing 29. As illustrated in FIG. 2, the second heat sink 7 is fixed to the motor housing 5 by screw threads 90.

As illustrated in FIG. 2, the first heat sink 6 includes a body portion 6a and a housing portion 6b surrounding the periphery of the body portion 6a in a direction perpendicular to the axial direction X. The outer wall shape of the housing portion 6b is a generally square shape that is the same shape as the opening end portion of the motor housing 5. The housing portion 6b is provided to face the body portion 6a in the direction perpendicular to the axial direction X. The outer wall surface of the housing portion 6b is exposed to outside the motor device 1. The first heat sink 6 is provided so as to promote heat dissipation from the control element group 3b provided on the control substrate 3 and the power element group 4b provided on the power substrate 4. The body portion 6a is formed to connect two surfaces facing each other in the inner wall surface of the housing portion 6b. The body portion 6a has a shape that avoids interference with a capacitor 42 (described later) in the power element group 4b provided in the power substrate 4. In the meantime, the body portion 6a has a shape facing, in the axial direction X, a switching element 41 (described later) in the power element group 4b provided on the power substrate 4 and a microcomputer 31 (described later) in the control element group 3b provided on the control substrate 3. As illustrated in FIG. 1, the first heat sink 6 is fixed to the motor housing 5 by screw threads 91.

The second heat sink 7 has a heat capacity larger than that of the first heat sink 6. In the present embodiment, since the second heat sink 7 and the first heat sink 6 are made of a metal material of the same type, and the second heat sink 7 has a gross mass larger than that of the first heat sink 6, the second heat sink 7 has a heat capacity larger than that of the first heat sink 6. The reason why the second heat sink 7 has a gross mass larger than that of the first heat sink 6 is because the first heat sink 6 has some hollow-shaped parts so as to avoid interference with the capacitor 42, and the second heat sink 7 has more thick parts than the first heat sink 6.

As illustrated in FIGS. 2 and 3, the information transfer portion 8 includes a plurality of tubular portions 81 extending in the plate-thickness directions of the control substrate 3 and the power substrate 4, and a cover portion 82 extending from the tubular portions 81 in the direction perpendicular to the axial direction X. Each of the tubular portions 81 is formed such that a wiring line extending from an external device is connectable thereto. In a state where the control substrate 3 is fixed to the information transfer portion 8, a connection terminal extending from a terminal in each tubular portion 81 is connected to a predetermined position in the control substrate 3. As the external device, an in-vehicle power supply configured to supply electric power to the motor 2, the control substrate 3, and the power substrate 4 is connected, for example. The cover portion 82 has a generally square shape that is the same shape as the opening end portion of the motor housing 5 or the first heat sink 6. The tubular portions 81 are placed to be closer to an outer edge of the cover portion 82. That is, the tubular portions 81 are not placed in a central part of the cover portion 82. The information transfer portion 8 is fixed to the first heat sink 6 by screw threads 92.

The control substrate 3 and the power substrate 4 are placed side by side in the axial direction X. The control substrate 3 is placed to face the power substrate 4 in the plate-thickness direction of the control substrate 3. That is, the plate-thickness direction of the control substrate 3 and the plate-thickness direction of the power substrate 4 are along the axial direction X. The control substrate 3 is fixed to the information transfer portion 8 by screw threads 94. Further, the power substrate 4 is fixed to the first heat sink 6 by screw threads 93.

The control substrate 3 includes a substrate portion 3a as a printed circuit board, and a control element group 3b constituted by a plurality of control elements provided on the substrate portion 3a. The control element group 3b is an element group for controlling driving of the motor 2. The control element group 3b includes the microcomputer 31 configured to calculate a target value for a driving current to be supplied to the motor 2. Further, the control element group 3b includes elements such as a pre-driver 32 and a power circuit IC 33 in addition to the microcomputer 31. The microcomputer 31 controls an operation of the switching element 41 (described later). The pre-driver 32 is an element configured to drive the switching element 41 constituting an inverter. The power circuit IC 33 is an element configured to switch between supply of electric power from the in-vehicle power supply to the microcomputer 31 and shut-off of electric power. The microcomputer 31 is provided on an opposite surface of the substrate portion 3a from the information transfer portion 8. The pre-driver 32 and the power circuit IC 33 are provided on a surface of the substrate portion 3a on the information transfer portion 8 side.

The power substrate 4 includes a substrate portion 4a as a printed circuit board, and a power element group 4b constituted by a plurality of power elements provided on the substrate portion 4a. The power element group 4b is an element group for supplying a driving current to the motor 2. The power element group 4b includes the switching element 41 constituting the inverter, and the capacitor 42. The power element group 4b includes an element such as a shunt resistor (not shown), for example, in addition to the switching element 41 and the capacitor 42. The switching element 41 is provided on a surface of the substrate portion 4a on the second heat sink 7 side. Further, the capacitor 42 is provided on a surface of the substrate portion 4a on the first heat sink 6 side.

A magnetic sensor 43 is also provided on the substrate portion 4a in addition to the power element group 4b. The magnetic sensor 43 is provided on the surface of the substrate portion 4a on the second heat sink 7 side. A magnet 44 is attached to an end portion of the rotating shaft 2a, the end portion facing the power substrate 4. The magnetic sensor 43 faces the magnet 44 via a gap in the axial direction X of the rotating shaft 2a. The magnetic sensor 43 generates an electrical signal corresponding to a magnetic field changing along with the rotation of the magnet 44. The electrical signal is used to calculate a rotation angle of the rotating shaft 2a of the motor 2.

The control substrate 3 and the power substrate 4 are connected to each other via a plurality of connection terminals 50. The control substrate 3 and the power substrate 4 transfer information to each other via the connection terminals 50. More specifically, the information to be transferred via the connection terminals 50 includes a control signal for switching the switching element 41 between ON and OFF and the electrical signal generated by the magnetic sensor 43.

An element predominantly occupying a heat generation amount from the control substrate 3 in the control element group 3b is the microcomputer 31. Further, an element predominantly occupying a heat generation amount from the power substrate 4 in the power element group 4b is the switching element 41. When these elements are compared with each other, the switching element 41 has a larger heat generation amount because a large current flows through the switching element 41 in comparison with the microcomputer 31. Because of this, the whole heat generation amount from the power element group 4b is larger than the whole heat generation amount from the control element group 3b. On this account, the power substrate 4 on which the power element group 4b is provided is a substrate with a larger heat generation amount from the element group than that of the control substrate 3 on which the control element group 3b is provided.

In the motor device 1 configured as such, when a driving current is supplied to the motor coil 24 from the power substrate 4, a rotating field is generated in the stator 21, and the rotor 22 rotates based on the rotating field.

The following describes a heat dissipation structure of the motor device 1. In order to increase heat conductivity from the control substrate 3 to the first heat sink 6, a first heat dissipation material 101 configured to bring the control substrate 3 into thermal contact with the first heat sink 6 is provided between the control substrate 3 and the first heat sink 6 in the axial direction X. The first heat dissipation material 101 is fluid heat dissipation grease made of a material having a high coefficient of thermal conductivity, e.g., silicon or the like. The first heat dissipation material 101 is provided in a region that overlaps, in the axial direction X, with a part where at least the microcomputer 31 in the control element group 3b is provided on the substrate portion 3a. Heat is dissipated from the control substrate 3 by a first heat dissipation path. The first heat dissipation path is a heat dissipation path through which heat generated from the microcomputer 31 is transmitted from the control substrate 3 to the first heat sink 6 via the first heat dissipation material 101 and then transmitted from the first heat sink 6 to the motor housing 5.

In order to increase heat conductivity from the power substrate 4 to the first heat sink 6, a second heat dissipation material 102 configured to bring the power substrate 4 into thermal contact with the first heat sink 6 is provided between the power substrate 4 and the first heat sink 6 in the axial direction X. The second heat dissipation material 102 is fluid heat dissipation grease made of a material having a high coefficient of thermal conductivity, e.g., silicon or the like. The second heat dissipation material 102 is provided in a region that overlaps, in the axial direction X, with a part where at least the switching element 41 in the power element group 4b is provided on the substrate portion 4a. Heat is dissipated from the power substrate 4 by a second heat dissipation path. The second heat dissipation path is a heat dissipation path through which heat generated from the switching element 41 is transmitted from the power substrate 4 to the first heat sink 6 via the second heat dissipation material 102 and then transmitted from the first heat sink 6 to the motor housing 5.

In order to increase heat conductivity from the power substrate 4 to the second heat sink 7, a third heat dissipation material 103 configured to bring the power substrate 4 into thermal contact with the second heat sink 7 is provided between the power substrate 4 and the second heat sink 7 in the axial direction X. The third heat dissipation material 103 is fluid heat dissipation grease made of a material having a high coefficient of thermal conductivity, e.g., silicon or the like. The third heat dissipation material 103 is provided in a region that overlaps, in the axial direction X, with a part where at least the switching element 41 in the power element group 4b is provided on the substrate portion 4a. Heat is dissipated from the power substrate 4 as a substrate with a heat generation amount larger than that of the control substrate 3 through the third heat dissipation path in addition to the second heat dissipation path. The third heat dissipation path is a heat dissipation path through which heat generated from the switching element 41 is transmitted from the power substrate 4 to the second heat sink 7 via the third heat dissipation material 103 and then transmitted from the second heat sink 7 to the motor housing 5. Note that, when such heat reaches the first heat sink 6 or the motor housing 5, the heat is dissipated to outside the motor device 1.

The following describes operations in the present embodiment.

The surface of the control substrate 3 on the second axial direction side in the plate-thickness direction faces the first heat sink 6. Heat from the control element group 3b provided on the control substrate 3 is promoted to be dissipated from the surface of the control substrate 3 on the second axial direction side in the plate-thickness direction to the first heat sink 6. Further, the surface of the power substrate 4 on the first axial direction side in the plate-thickness direction faces the first heat sink 6, and the surface of the power substrate 4 on the second axial direction side in the plate-thickness direction faces the second heat sink 7. In terms of the power element group 4b provided on the power substrate 4 and having a heat generation amount larger than that of the control element group 3b provided on the control substrate 3, heat is promoted to be dissipated from the surface of the power substrate 4 on the first axial direction side in the plate-thickness direction to the first heat sink 6, and heat is promoted to be dissipated from the surface of the power substrate 4 on the second axial direction side in the plate-thickness direction to the second heat sink 7. Hereby, heat can be dissipated from the opposite sides of the power substrate 4 in the plate-thickness direction, thereby making it possible to more actively promote heat dissipation from the power substrate 4 than heat dissipation from the control substrate 3.

The following describes effects of the present embodiment.

(1) Since it is possible to more actively promote heat dissipation from the power substrate 4 than heat dissipation from the control substrate 3, heat dissipation performance of the motor device 1 can be increased.

(2) Respective heat dissipation paths for the heat sinks facing the substrates can be secured appropriately. This makes it possible to effectively promote heat dissipation from the substrates.

(3) When the heat generation amount of the switching element 41 is compared with the heat generation amount of the microcomputer 31, it is generally known that the heat generation amount of the switching element 41 is larger than the heat generation amount of the microcomputer 31. That is, the heat generation amount from the power element group 4b is larger than the heat generation amount from the control element group 3b. In this case, it is preferable that the motor device 1 employ the above configurations.

(4) Heat transmitted from the power element group 4b provided on the power substrate 4 to the second heat sink 7 is transmitted to the motor housing 5 making thermal contact with the second heat sink 7. Hereby, heat that reaches the outer wall surface of the motor housing 5 can be dissipated to outside the motor device 1.

(5) Heat transmitted to the first heat sink 6 from the control element group 3b provided on the control substrate 3 and the power element group 4b provided on the power substrate 4 is transmitted to the motor housing 5 making thermal contact with the first heat sink 6. Hereby, heat that reaches the outer wall surface of the motor housing 5 can be dissipated to outside the motor device 1.

(6) Heat that reaches the outer wall surface of the housing portion 6b of the first heat sink 6 can be dissipated to outside the motor device 1.

(7) Since the control substrate 3 has a heat generation amount smaller than that of the power substrate 4, the amount of heat transmitted from the control substrate 3 to the first heat sink 6 is relatively small. Because of this, the first heat sink 6 can easily have a margin of heat dissipation performance. By forming the second heat dissipation path so that heat can be dissipated from the power substrate 4 to the first heat sink 6, it is possible to further promote heat dissipation from the power substrate 4.

The above embodiment may be modified as follows. Further, the following other embodiments can be combined with each other as long as they do not cause any technical inconsistencies.

The first heat dissipation material 101, the second heat dissipation material 102, and the third heat dissipation material 103 are not limited to fluid heat dissipation grease made of a material having a high coefficient of thermal conductivity, e.g., silicon or the like, and may be solid heat dissipation grease or may be a heat dissipation sheet that increases heat conductivity.

A substrate placed to be close to the first heat sink 6 but placed to be distanced from the second heat sink 7 is not limited to the control substrate 3 and may be a substrate with a relatively small heat generation amount from an element group out of two substrates, for example. The substrate with a relatively small heat generation amount from the element group should be configured such that the heat generation amount of the whole element group is relatively small. In view of this, the substrate with a relatively small heat generation amount from the element group is not limited to a substrate on which only a control element is provided and may be a substrate on which a power element is provided in addition to a control element. Further, the substrate placed between the first heat sink 6 and the second heat sink 7 is not limited to the power substrate 4 and may be a substrate with a relatively large heat generation amount from an element group out of the two substrates, for example. The substrate with a relatively large heat generation amount from the element group should be configured such that the heat generation amount of the whole element group is relatively large. In view of this, the substrate with a relatively large heat generation amount from the element group is not limited to a substrate on which only a power element is provided and may be a substrate on which a control element is provided in addition to a power element.

The first heat dissipation material 101 is provided between the control substrate 3 and the first heat sink 6 in the axial direction X. However, the control substrate 3 may make direct contact with the first heat sink 6 or may make thermal contact with the first heat sink 6 via air. The second heat dissipation material 102 is provided between the power substrate 4 and the first heat sink 6 in the axial direction X. However, the power substrate 4 may make direct contact with the first heat sink 6 or may make thermal contact with the first heat sink 6 via air. The third heat dissipation material 103 is provided between the power substrate 4 and the second heat sink 7 in the axial direction X. However, the power substrate 4 may make direct contact with the second heat sink 7 or may make thermal contact with the second heat sink 7 via air.

The heat capacity of the second heat sink 7 may be smaller than the heat capacity of the first heat sink 6 or may be the same as the heat capacity of the first heat sink 6.

The second heat sink 7 and the first heat sink 6 may be made of different types of materials. Further, the total mass of the second heat sink 7 may be smaller than the total mass of the first heat sink 6 or may be the same as the total mass of the first heat sink 6.

The control substrate 3 is fixed to the information transfer portion 8 by the screw threads 92 but is not limited to this. For example, the control substrate 3 may be fixed to the first heat sink 6 by screw threads or may be fixed to the second heat sink 7 by screw threads. Further, the power substrate 4 is fixed to the first heat sink 6 by the screw threads 93 but is not limited to this. For example, the power substrate 4 may be fixed to the second heat sink 7 by screw threads or may be fixed to the information transfer portion 8 by screw threads. Note that fixation methods of the control substrate 3 and the power substrate 4 are not limited to screw threads.

The second heat sink 7 is placed between the power substrate 4 and the motor 2 but is not limited to this, provided that the second heat sink 7 is placed on the opposite side of the power substrate 4 from the first heat sink 6. For example, the power substrate 4 may be placed between the first heat sink 6 and the second heat sink 7, and the control substrate 3 may be placed between the first heat sink 6 and the motor 2.

The second heat sink 7 is fixed to the motor housing 5 but is not limited to this. To which the second heat sink 7 is fixed is modifiable appropriately, and the second heat sink 7 may be fixed to the first heat sink 6, for example.

The first heat sink 6 is fixed to the motor housing 5 but is not limited to this. To which the first heat sink 6 is fixed is modifiable appropriately, and the first heat sink 6 may be fixed to the second heat sink 7, for example.

The first heat sink 6 includes the housing portion 6b surrounding the periphery of the body portion 6a but may not include the housing portion 6b. For example, the first heat sink 6 may be configured such that the periphery of the body portion 6a is surrounded by the motor housing 5 so that the first heat sink 6 is not exposed to the outer surface of the motor device 1.

Only one control element group 3b may be provided on the control substrate 3, or two or more control element groups 3b may be provided redundantly. Further, only one power element group 4b may be provided on the power substrate 4, or two or more power element groups 4b may be provided redundantly.

The shape of the motor device 1 is modifiable appropriately.

The motor device 1 is not limited to a motor device provided in an electric power steering system of a vehicle and may be a motor device provided in a steering unit configured to steer wheels of a vehicle, for example.

What is claimed is:

1. A motor device comprising:
a motor;
a first substrate on which a first element group is provided;
a second substrate on which a second element group is provided, the second element group having a heat generation amount larger than a heat generation amount of the first element group, the second substrate being placed to face the first substrate in a plate-thickness direction of the second substrate;
a first heat sink placed between the first substrate and the second substrate, the first heat sink being configured to promote heat dissipation from the first element group and the second element group; and
a second heat sink placed on an opposite side of the second substrate from the first heat sink, the second heat sink being configured to promote heat dissipation from the second element group,
wherein the first heat sink includes a body portion facing the first substrate and the second substrate, and a housing portion connected to the body portion, the housing portion being configured to surround a periphery of the body portion and exposed to outside the motor device, the body portion, housing portion, and heat sink are integral to each other.

2. The motor device according to claim 1, wherein:
the first substrate and the first heat sink are configured to make thermal contact with each other via a heat dissipation material;

the first heat sink and the second substrate are configured to make thermal contact with each other via a heat dissipation material; and the second substrate and the second heat sink are configured to make thermal contact with each other via a heat dissipation material.

3. The motor device according to claim 1, wherein:

the second element group is a power element group including a switching element having a function to supply a current to the motor; and the first element group is a control element group including a microcomputer configured to control an operation of the switching element.

4. The motor device according to claim 1, further comprising a motor housing in which the motor is accommodated, the motor housing being bottomed tubular, wherein:

the second heat sink closes an opening of the motor housing and is fixed to an inner wall surface of the motor housing; and the second heat sink is configured to make thermal contact with the motor housing via a fixed part of the second heat sink to the motor housing.

5. The motor device according to claim 1, further comprising a motor housing in which the motor is accommodated, wherein:

the first heat sink is fixed to the motor housing; and the first heat sink is configured to make thermal contact with the motor housing via a fixed part of the first heat sink to the motor housing.

6. A motor device comprising:

a motor;

a first substrate on which a first element group is provided;

a second substrate on which a second element group is provided, the second element group having a heat generation amount larger than a heat generation amount of the first element group, the second substrate being placed to face the first substrate in a plate-thickness direction of the second substrate;

a first heat sink placed between the first substrate and the second substrate, the first heat sink being configured to promote heat dissipation from the first element group and the second element group;

a second heat sink placed on an opposite side of the second substrate from the first heat sink, the second heat sink being configured to promote heat dissipation from the second element group; and a motor housing in which the motor is accommodated, the motor housing being bottomed tubular, wherein:

the second heat sink closes an opening of the motor housing and is fixed to an inner wall surface of the motor housing; and the second heat sink is configured to make thermal contact with the motor housing via a fixed part of the second heat sink to the motor housing, and the first heat sink includes a body portion facing the first substrate and the second substrate, and a housing portion connected to the body portion, the housing portion being configured to surround a periphery of the body portion and exposed to outside the motor device.

\* \* \* \* \*